(12) United States Patent
Pelekhaty

(10) Patent No.: US 7,342,712 B2
(45) Date of Patent: Mar. 11, 2008

(54) FILTERS, INCLUDING OPTICAL FILTERS, HAVING EQUAL GROUP DELAY RIPPLE AND MINIMIZED PHASE NON-LINEARITY WITHIN THEIR PASS BANDS

(75) Inventor: Vladimir Pelekhaty, Orlando, FL (US)

(73) Assignee: Ciena Corporation, Linthicum, MD (US)

( * ) Notice: Subject to any disclaimer, the term of this patent is extended or adjusted under 35 U.S.C. 154(b) by 159 days.

(21) Appl. No.: 11/246,645

(22) Filed: Oct. 7, 2005

(65) Prior Publication Data

US 2007/0081247 A1 Apr. 12, 2007

(51) Int. Cl.
*H01S 3/00* (2006.01)
*G02B 5/28* (2006.01)

(52) U.S. Cl. .................... 359/337.1; 359/589
(58) Field of Classification Search .............. 359/337.1, 359/337.11, 589
See application file for complete search history.

(56) References Cited

U.S. PATENT DOCUMENTS 6,853,756 B2 * 2/2005 Gerlach et al. ............... 385/1
7,206,477 B2 * 4/2007 Madsen ....................... 385/24
2006/0067695 A1 * 3/2006 Doerr et al. ................. 398/85

FOREIGN PATENT DOCUMENTS

JP 02004170838 A * 6/2004

\* cited by examiner

*Primary Examiner*—Mark Hellner
(74) *Attorney, Agent, or Firm*—Clements Walker; Christopher L. Bernard; Tyler S. Brown

(57) ABSTRACT

The present invention provides an optical telecommunications network that includes at least one of a filter having equal group delay ripple and minimized phase non-linearity which is formed by the process including limiting at least one of the group delay ripple and the phase non-linearity of the filter between a predetermined upper boundary and a predetermined lower boundary, wherein such limiting includes selecting a baseline filter of a predetermined order having a given transmission at a given frequency from a center frequency of the baseline filter; deriving a scaling factor by, where the given transmission of the baseline filter is equal to a predetermined transmission of the filter, comparing the given frequency from the center frequency of the baseline filter to a predetermined frequency from a center frequency of the filter; applying the scaling factor to a denominator polynomial of the baseline filter to obtain a denominator polynomial of the filter; and performing simplex-type multi-parameter optimization of at least one of a calculated group delay and a calculated phase non-linearity within a predetermined frequency band.

25 Claims, 4 Drawing Sheets

FILTERS, INCLUDING OPTICAL FILTERS, HAVING EQUAL GROUP DELAY RIPPLE AND MINIMIZED PHASE NON-LINEARITY WITHIN THEIR PASS BANDS

FIELD OF THE INVENTION

The present invention relates generally to improved filters, including optical filters, for use in optical telecommunications networks and the like. More specifically, the present invention relates to improved filters, including optical filters, having equal group delay ripple and minimized phase non-linearity within their pass bands.

BACKGROUND OF THE INVENTION

There are several state-of-the-art filters, including optical filters, for use in optical telecommunications networks and the like. These include Butterworth filters, Chebychev filters, Bessel filters, and elliptical filters, among others.

A Butterworth filter is characterized by a response that is relatively flat within its pass band, but which cuts off relatively sharply outside of its pass band. It is essentially a low-pass filter with its poles arranged with equal spacing around a semicircular locus. Thus, the Butterworth filter represents a maximally flat transmission filter.

As is well known to those of ordinary skill in the art, by bringing the poles closer to the jω axis (and thereby increasing their quality factors (Qs)) in equal proportion such that the poles lie on an ellipse, the resulting filter has a frequency cutoff that is steeper than that of the Butterworth filter. However, the effects of each pole are visible in the frequency response of the filter, resulting in a variation in amplitude that is known as ripple in the pass band. With proper pole arrangement, variations can be made equal, providing a Chebychev filter. Thus, the Chebychev filter represents an equal transmission ripple filter.

The Bessel filter represents a tradeoff in the opposite direction. The Bessel filter's poles lie on a locus that is further from the jω axis, increasing transient response, but at the expense of a less steep cutoff in the stop band. Thus, the Bessel filter represents a flat group delay filter. The Bessel filter also represents a maximally linear phase filter, within a certain pass band around its center frequency.

By increasing the Qs of the poles nearest the pass band edge, a filter with shaper stop band cutoff than that of the Chebychev filter is obtained, without incurring more pass band ripple. The resulting gain peak is compensated for by providing a zero at the bottom of the stop band, and additional zeroes are spaced along the stop band to ensure that the filter response remains below a predetermined level of stop band attenuation. The result is the elliptical filter. Thus, the elliptical filter represents an equal rejection ripple filter. The elliptical filter's high-Q poles produce a transient response that is worse than that of the Chebychev filter. In addition, the elliptical filter is not realizable as an optical filter in the form of a multi-layer dielectric interference optical filter, as its transfer function has a numerator polynomial, generating non-infinity transmission zeroes. The first three filter types are realizable as optical filters, including multi-layer dielectric interference optical filters, as their transfer functions have only denominator polynomials.

In general, the Butterworth filter has desirable maximally flat transmission within its pass band, which gradually rolls off outside of the pass band. The Chebychev filter has significantly steeper roll off outside of its pass band, but its group delay is more severe than that of the Butterworth filter due to the extra group delay ripple associated with the equal transmission ripple within the pass band. The phase non-linearity of the Chebychev filter is also more severe than that of the Butterworth filter because of the phase non-linearity associated with the equal transmission ripple within the pass band. The Bessel filter has maximally flat group delay and maximally linear phase within its pass band, but rolls off even more gradually than the Butterworth filter outside of the pass band. Each of these filters is realizable as a multi-coupled resonant structure, such as an optical ring resonator, a Fabry-Perot resonator, or the like.

What is still needed in the art, however, is a filter that has its group delay limited between two boundaries, an upper boundary and a lower boundary. Thus, the peak-to-peak group delay ripple of the filter would not exceed the difference between the two boundaries. What is also still needed in the art is a filter that has its phase non-linearity limited between two boundaries, an upper boundary and a lower boundary. Thus, the phase of the filter would have minimum deviation from linear, not exceeding half the difference between the two boundaries. The eye closure penalty caused by the dispersion of optical filters is proportional to the amount of deviation of their phase characteristics from linear within the spectral band of the signal. The reduction of the deviation of these phase characteristics from linear within the spectral band of the signal is essential to the reduction of the eye closure penalty caused by the dispersive properties of such optical filters.

BRIEF SUMMARY OF THE INVENTION

In various exemplary embodiments, the present invention provides a filter that is based on the generation of the proper denominator polynomial in its transfer function, the power of the denominator polynomial defining the order of the filter and the coefficients of the polynomial defining the shapes or dependencies of the amplitude transmission, group delay, and phase versus frequency. This denominator polynomial, and specifically its roots, are used to determine the values of parameters necessary for the physical realization of the filter, such as the reflectivity of its mirrors and the like.

In one exemplary embodiment of the present invention, a method for providing a filter having equal group delay ripple includes limiting the group delay ripple of the filter between a predetermined upper boundary and a predetermined lower boundary, wherein limiting the group delay ripple of the filter between the predetermined upper boundary and the predetermined lower boundary includes selecting a baseline filter of a predetermined order having a given transmission at a given frequency from a center frequency of the baseline filter; deriving a scaling factor by, where the given transmission of the baseline filter is equal to a predetermined transmission of the filter, comparing the given frequency from the center frequency of the baseline filter to a predetermined frequency from a center frequency of the filter; applying the scaling factor to a denominator polynomial of the baseline filter to obtain a denominator polynomial of the filter; and performing simplex-type multi-parameter optimization of a calculated group delay within a predetermined frequency band.

In another exemplary embodiment of the present invention, a method for providing a filter having minimized phase non-linearity includes limiting the phase non-linearity of the filter between a predetermined upper boundary and a predetermined lower boundary, wherein limiting the phase non-linearity of the filter between the predetermined upper boundary and the predetermined lower boundary includes selecting a baseline filter of a predetermined order having a given transmission at a given frequency from a center frequency of the baseline filter; deriving a scaling factor by, where the given transmission of the baseline filter is equal to a predetermined transmission of the filter, comparing the given frequency from the center frequency of the baseline filter to a predetermined frequency from a center frequency of the filter; applying the scaling factor to a denominator polynomial of the baseline filter to obtain a denominator polynomial of the filter; and performing simplex-type multi-parameter optimization of a calculated phase non-linearity within a predetermined frequency band.

In a further exemplary embodiment of the present invention, an equal group delay ripple filter is formed by the process which includes limiting the group delay ripple of the filter between a predetermined upper boundary and a predetermined lower boundary, wherein limiting the group delay ripple of the filter between the predetermined upper boundary and the predetermined lower boundary includes selecting a baseline filter of a predetermined order having a given transmission at a given frequency from a center frequency of the baseline filter; deriving a scaling factor by, where the given transmission of the baseline filter is equal to a predetermined transmission of the filter, comparing the given frequency from the center frequency of the baseline filter to a predetermined frequency from a center frequency of the filter; applying the scaling factor to a denominator polynomial of the baseline filter to obtain a denominator polynomial of the filter; and performing simplex-type multi-parameter optimization of a calculated group delay within a predetermined frequency band.

In a still further exemplary embodiment of the present invention, a minimized phase non-linearity filter is formed by the process which includes limiting the phase non-linearity of the filter between a predetermined upper boundary and a predetermined lower boundary, wherein limiting the phase non-linearity of the filter between the predetermined upper boundary and the predetermined lower boundary includes selecting a baseline filter of a predetermined order having a given transmission at a given frequency from a center frequency of the baseline filter; deriving a scaling factor by, where the given transmission of the baseline filter is equal to a predetermined transmission of the filter, comparing the given frequency from the center frequency of the baseline filter to a predetermined frequency from a center frequency of the filter; applying the scaling factor to a denominator polynomial of the baseline filter to obtain a denominator polynomial of the filter; and performing simplex-type multi-parameter optimization of a calculated phase non-linearity within a predetermined frequency band.

In a still further exemplary embodiment of the present invention, an optical telecommunications network includes at least one of a filter having equal group delay ripple and a filter having minimized phase non-linearity that is formed by the process which includes limiting at least one of the group delay ripple and the phase non-linearity of the filter between a predetermined upper boundary and a predetermined lower boundary, wherein limiting at least one of the group delay ripple and the phase non-linearity of the filter between the predetermined upper boundary and the predetermined lower boundary includes selecting a baseline filter of a predetermined order having a given transmission at a given frequency from a center frequency of the baseline filter; deriving a scaling factor by, where the given transmission of the baseline filter is equal to a predetermined transmission of the filter, comparing the given frequency from the center frequency of the baseline filter to a predetermined frequency from a center frequency of the filter; applying the scaling factor to a denominator polynomial of the baseline filter to obtain a denominator polynomial of the filter; and performing simplex-type multi-parameter optimization of at least one of a calculated group delay and a calculated phase non-linearity within a predetermined frequency band.

BRIEF DESCRIPTION OF THE DRAWINGS

The present invention is illustrated and described herein with reference to the various drawings, in which like reference numbers denote like system components and/or method steps, and in which.

DETAILED DESCRIPTION OF THE INVENTION

Figure 1:
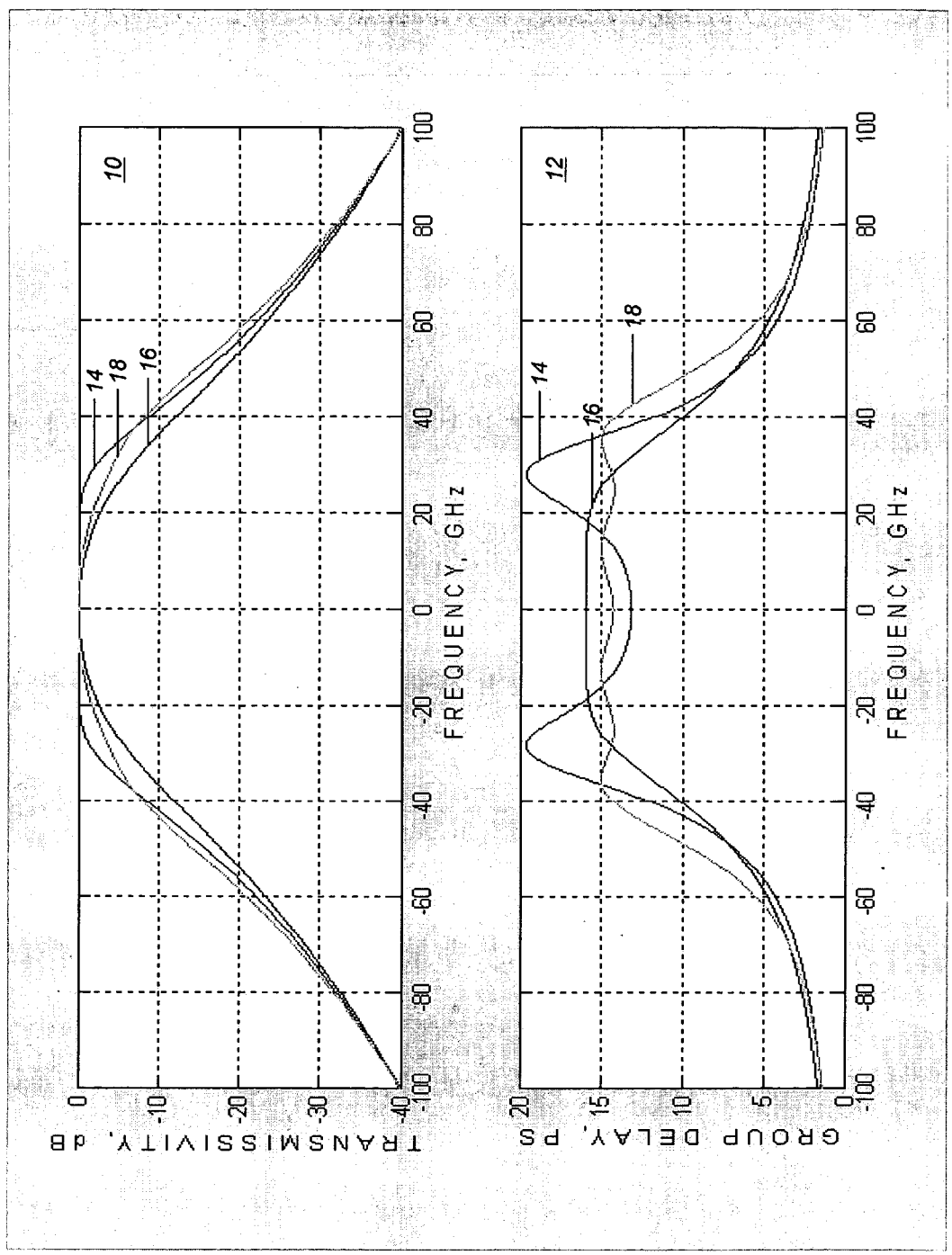
FIG. 1 is a series of plots illustrating the transmittances in decibels and the group delay in picoseconds for the Butterworth filter, the Bessel filter, and the filter of the present invention.

As described above, the non-ideal transmission characteristics of the Butterworth filter, the Chebychev filter, the Bessel filter, and the elliptical filter impair signal integrity by intra-channel spectral limitation and inadequate inter-channel isolation. The adverse influence of group delay dispersion is even more severe, causing the closure of the optical eye diagram. Optical eye diagram closure (the eye closure penalty) increases with group delay variation within the pass band of each filter. In terms of group delay, the Bessel filter is preferred due to its relatively flat group delay characteristics. However, the Bessel filter still suffers from poor quality transmission characteristics.

If the group delay variation of a filter is limited to a narrow region confined between two boundaries, the eye closure penalty is also limited, and decreases with a decreasing difference between the upper and lower boundaries of the group delay ripple. Thus, the resulting filter has some predetermined, limited group delay ripple which results in only an acceptable eye closure penalty. The limitation of this group delay ripple, and the acceptability of this eye closure penalty, frees the design parameters of the filter and allows for the optimization of the transmission characteristics of the filter. The Bessel filter, for example, can be used as a baseline and may then be improved. The result is a filter having the combined advantages of the group delay characteristics of the Bessel filter and the transmission characteristics of the Butterworth or Chebychev filters.

The derivation of the appropriate denominator polynomial of the transfer function is accomplished by the mathematical refinement of its coefficients, using the coefficients of either the Butterworth or Bessel filter's transfer function denominator polynomial as a starting point.

For example, a comparison of the equal group delay ripple filter of the present invention with Butterworth and Bessel filters of the same order is instructive. All three filters are fourth order filters and are designed to provide −40 dB isolation in transmission for the adjacent 40 Gb/s channels at 100 GHz channel separation distance. Their complex amplitude transmissions are represented as follows:

Butterworth: $t=1/(1+3.2973\ s+5.4362\ s^2+5.2500\ s^3+2.5351\ s^4)$,

Bessel: $t=1/(1+4.000\ s+6.8571\ s^2+6.0952\ s^3+2.4381\ s^4)$,

Equal Group Delay Ripple: $t=1/(1+3.5813\ s+6.0376\ s^2+4.8814\ s^3+2.8334\ s^4)$, where $s=j\omega$, $\omega$ is the normalized angular frequency, and $\omega=1.0$ corresponds to 40 GHz.

Filter Design Methodology

For this design example, a fourth order filter is selected and is required to have −40 dB transmission at ±100 GHz from the center frequency of the filter. The filter design process begins by taking into consideration a standard fourth order Butterworth filter having a complex amplitude transmission as follows:

Butterworth: $t=1/(1+2.6131\ s+3.4142\ s^2+2.6131\ s^3+s^4)$

The standard Butterworth filter has −3 dB transmission at $s=\pm j$, or , in normalized angular frequency, $\omega=\pm 1.0$, which corresponds to ±40 GHz in this case. The transmission of the standard Butterworth filter of order N falls to −40 dB at the normalized angular frequencies $\omega=\pm(10^{40dB/10}-1)^{1/2N}=\pm 3.1546$, which corresponds to ±126.18 GHz rather than the desired ±100 GHz. To accommodate this desired specification, the filter response is made 1.2618 times more narrow. This means that the normalized angular frequency must be scaled 1.2618 times. Thus, the complex amplitude transmission of the Butterworth filter becomes:

$t=1/(1+2.6131\times 1.2618\ s+3.4142\times 1.2618^2\ s^2\ +2.6131\times 1.2618^3\ s^3+1.2618^4\ s^4)=$
$1/(1+3.2973\ s+5.4362\ s^2+5.2500\ s^3+2.5351\ s^4)$, which is the same expression as that shown above, having 200 GHz bandwidth at −40 dB. The final complex amplitude transmission of the filter of the present invention is obtained by simplex-type multi-parameter optimization of the calculated group delay within the frequency band limited between −40 GHz and +40 GHz. An example of such an optimization procedure is the fininsearch function in MATLAB, which minimizes the function of many variables. The figure of merit for the optimization procedure is the difference between the maximum and minimum group delay within the specified frequency band between −40 GHz and +40 GHz. To prevent the filter from degradation into an all-pass unity transmission filter, which would ideally satisfy the requirement of minimum group delay ripple, the figure of merit is magnified drastically every time the transmission exceeds −40 dB at ±100 GHz from the center frequency of the filter.

FIG. 1 illustrates the transmittances 10 in decibels and the group delay 12 in picoseconds for the Butterworth filter 14, the Bessel filter 16, and the filter of the present invention 18. The figure demonstrates that the filter of the present invention 18 has better roll off characteristics than the Bessel filter 16 and equal group delay ripple within the frequency band limited between −40 GHz and +40 GHz.

Figure 2:
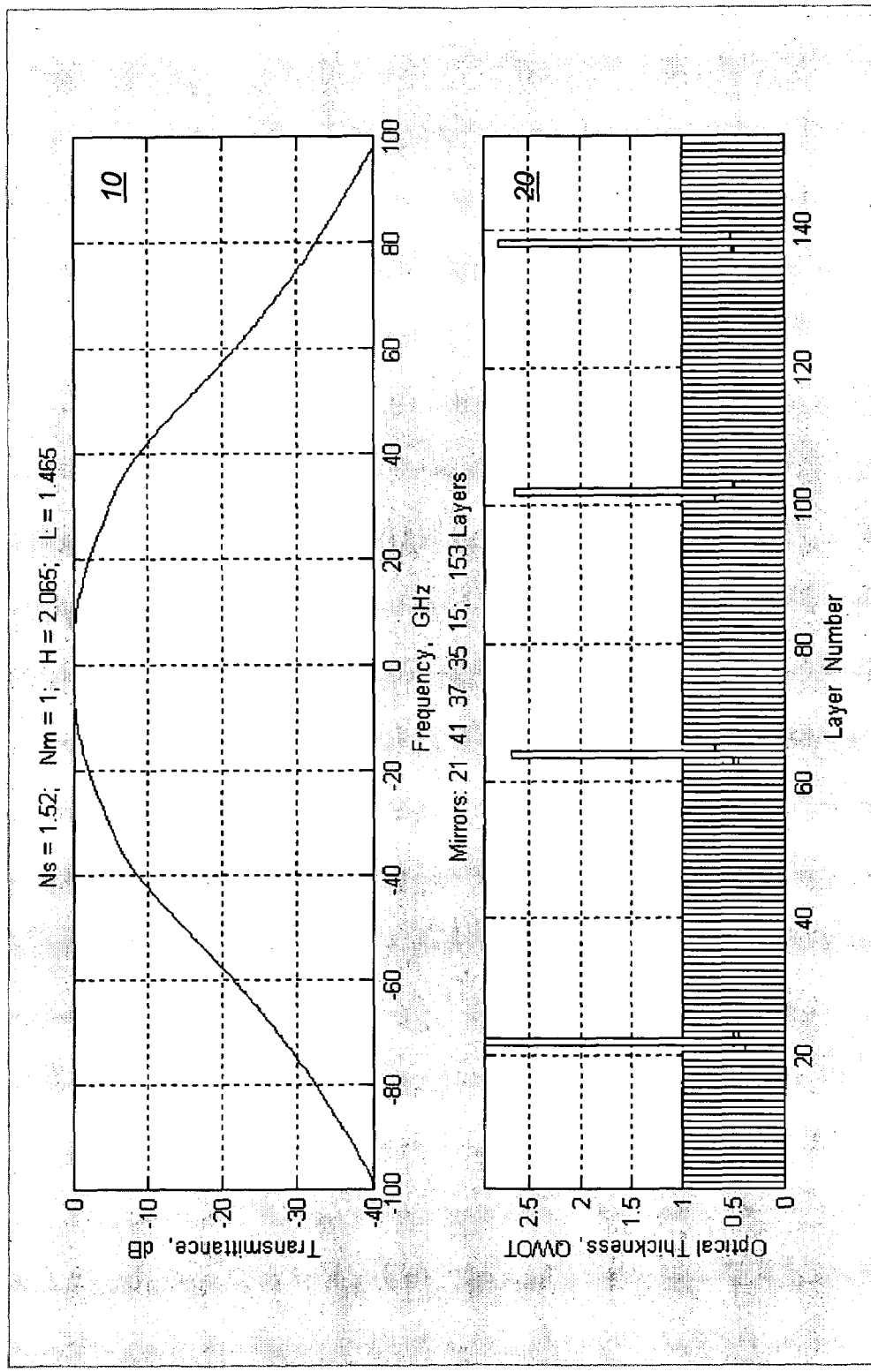
FIG. 2 is a plot and a graph illustrating an exemplary realization of the filter of the present invention, having equal group delay ripple within +/−40 GHz of the central frequency of the ITU channel.

FIG. 2 illustrates an exemplary realization of the filter of the present invention, having equal group delay ripple within +/−40 GHz of the central frequency of the ITU channel. This exemplary filter of the present invention is realized as a four-cavity multi-layer dielectric optical interference filter. It is designed for a glass substrate (Ns=1.52) and air as an incident medium (Nm=1.0). The high and low refractive index materials are $Ta_2O_5$ (H=2.065) and $SiO_2$ (L=1.465), respectively. The total number of layers is 153. Mirrors of the filter have 21, 41, 37, 35, and 15 layers. The quarter wave optical thicknesses (QWOTs) 20 at the center wavelength of the ITU channel for several non-quarter wave layers are provided below with their numbers:

| Layer No. | QWOTs |
| --- | --- |
| 21 | 0.3803 |
| 22 | 2.9547 |
| 23 | 0.4500 |
| 63 | 0.4500 |
| 64 | 2.6789 |
| 65 | 0.6790 |
| 101 | 0.6790 |
| 102 | 2.6442 |
| 103 | 0.4854 |
| 137 | 0.4854 |
| 138 | 2.7906 |
| 139 | 0.5095 |

In general, the unique quality of the filter of the present invention is that it combines the advantages of the Butterworth filter and the Bessel filter, having improved roll off characteristics in comparison to those of the Bessel filter and a firmly tamed group delay ripple within the pass band. The simulated eye closure for the 40 Gb CSRZ modulation format for the filter of the present invention is only 0.16 dB, as compared to 0.68 dB for the Butterworth filter, and the filter of the present invention has 22% higher eye opening, as compared to the Bessel filter.

Again, the non-ideal transmission characteristics of the Butterworth filter, the Chebychev filter, the Bessel filter, and the elliptical filter impair signal integrity by intra-channel spectral limitation and inadequate inter-channel isolation. The adverse influence of phase non-linearity is even more severe, causing the closure of the optical eye diagram. Optical eye diagram closure (the eye closure penalty) increases with increasing phase deviation from linear within the pass band of each filter. In terms of phase non-linearity, the Bessel filter is preferred due to its maximally linear phase characteristics. However, the Bessel filter still suffers from poor quality transmission characteristics.

If the phase non-linearity of a filter is limited to a narrow region confined between two boundaries, the eye closure penalty is also limited, and decreases with a decreasing difference between the upper and lower boundaries of the phase non-linearity. Thus, the resulting filter has some predetermined, limited phase non-linearity which results in only an acceptable eye closure penalty. The limitation of this phase non-linearity, and the acceptability of this eye closure penalty, frees the design parameters of the filter and allows for the optimization of the transmission characteristics of the filter. The Bessel filter, for example, can be used as a baseline and may then be improved. The result is a filter having the combined advantages of the phase characteristics of the Bessel filter and the transmission characteristics of the Butterworth or Chebychev filters.

The derivation of the appropriate denominator polynomial of the transfer function is accomplished by the mathematical refinement of its coefficients, using the coefficients of either the Butterworth or Bessel filter's transfer function denominator polynomial as a starting point.

For example, a comparison of the minimum phase non-linearity filter of the present invention with Butterworth and Bessel filters of the same order is instructive. All three filters are fourth order filters and are designed to provide −40 dB isolation in transmission for the adjacent 40 Gb/s channels at 100 GHz channel separation distance. Their complex amplitude transmissions are represented as follows:

Butterworth: $t=1/(1+3.2973\ s+5.4362\ s^2+5.2500\ s^3+2.5351\ s^4)$,

Bessel: $t=1/(1+4.000\ s+6.8571\ s^2+6.0952\ s^3+2.4381\ s^4)$,

Minimum Phase Non-Linearity: $t=1/(1+3.5\ s+5.97\ s^2+4.64\ s^3+2.92\ s^4)$, where $s=j\omega$, $\omega$ is the normalized angular frequency, and $\omega=1.0$ corresponds to 40 GHz.

Figure 3:
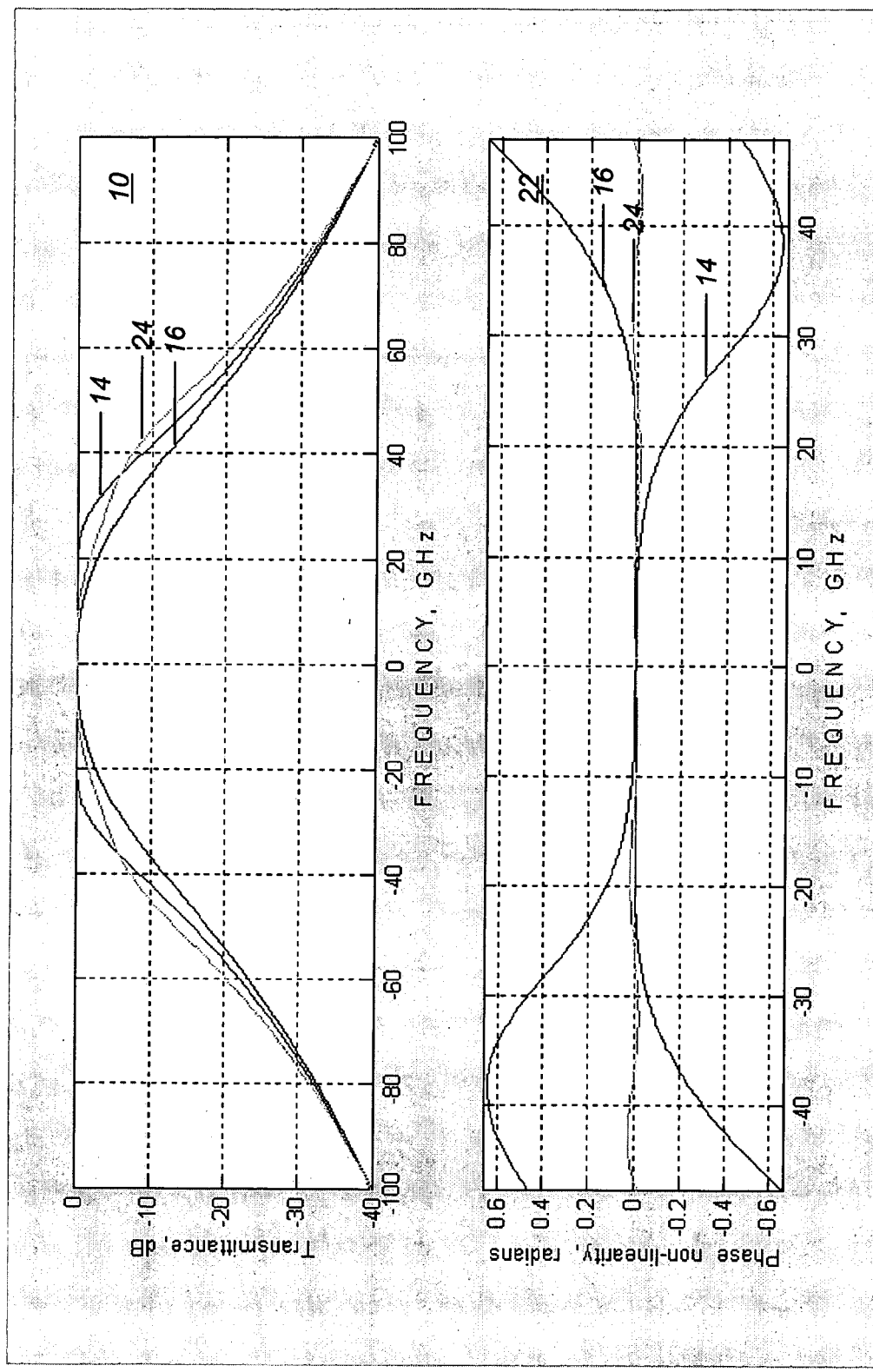
FIG. 3 is a series of plots illustrating the transmittances in decibels and the phase non-linearity in radians for the Butterworth filter, the Bessel filter, and the filter of the present invention.

FIG. 3 illustrates the transmittances 10 in decibels and the phase non-linearity 22 in radians for the Butterworth filter 14, the Bessel filter 16, and the filter of the present invention 24. The figure demonstrates that the filter of the present invention 24 has better roll off characteristics than the Bessel filter 16 and minimized phase non-linearity within the frequency band limited between −48 GHz and +48 GHz.

Figure 4:
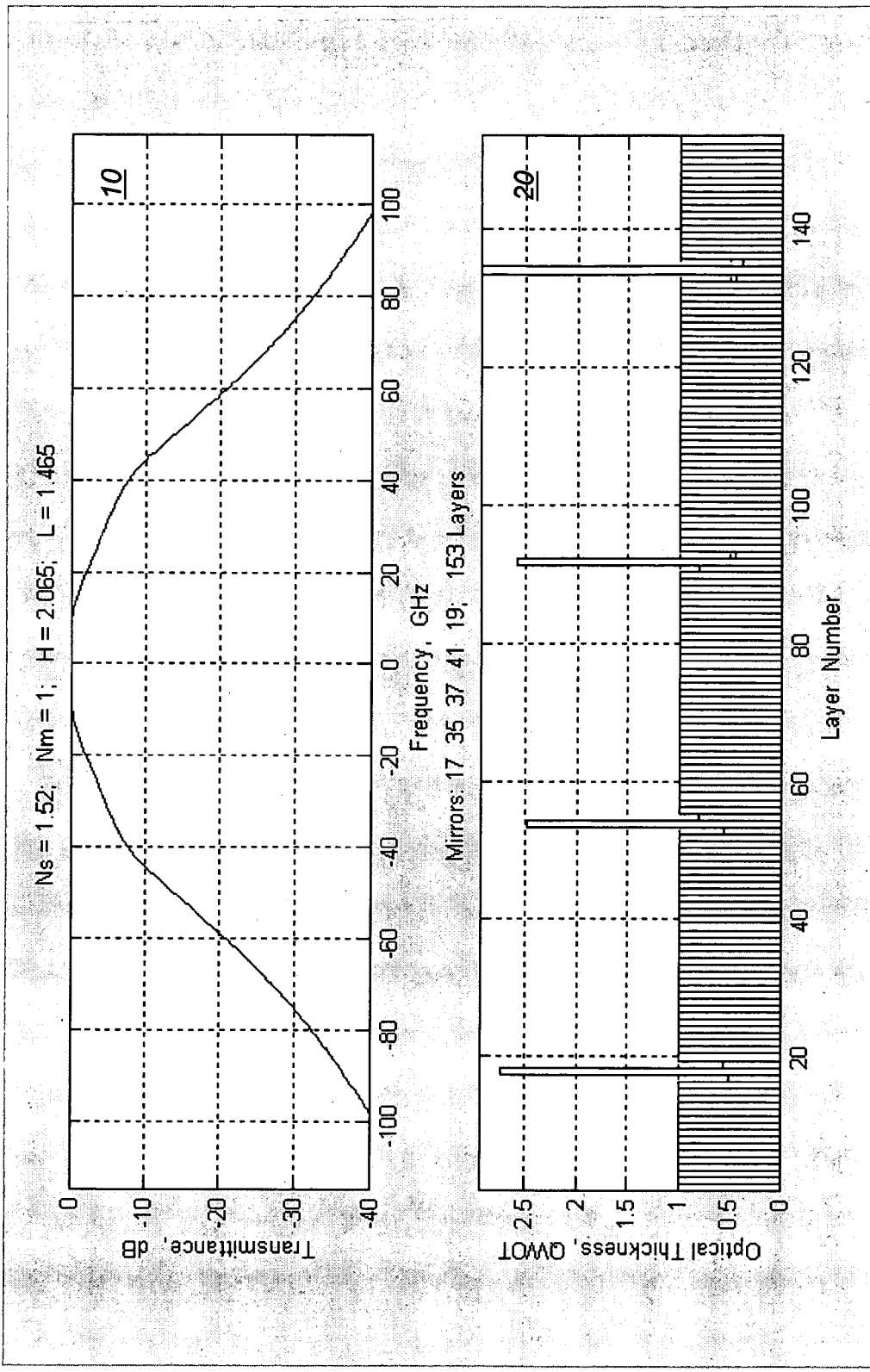
FIG. 4 is a plot and a graph illustrating an exemplary realization of the filter of the present invention, having minimized phase non-linearity within +/−48 GHz of the central frequency of the ITU channel.

FIG. 4 illustrates an exemplary realization of the filter of the present invention having minimized phase non-linearity within +/±48 GHz of the central frequency of the ITU channel. This exemplary filter of the present invention is realized as a four-cavity multi-layer dielectric optical interference filter. It is designed for a glass substrate (Ns=1.52) and air as an incident medium (Nm=1.0). The high and low refractive index materials are $Ta_2O_5$ (H=2.065) and $SiO_2$ (L=1.465), respectively. The total number of layers is 153. Mirrors of the filter have 17, 35, 37, 41, and 19 layers. The quarter wave optical thicknesses (QWOTs) 20 at the center wavelength of the ITU channel for several non-quarter wave layers are provided below with their numbers:

| Layer No. | QWOTs |
| --- | --- |
| 17 | 0.4947 |
| 18 | 2.7433 |
| 19 | 0.5515 |
| 53 | 0.5515 |
| 54 | 2.4867 |
| 55 | 0.8041 |
| 91 | 0.8041 |
| 92 | 2.5846 |
| 93 | 0.4479 |
| 133 | 0.4479 |
| 134 | 2.9541 |
| 135 | 0.3827 |

In general, the unique quality of the filter of the present invention is that it combines the advantages of the Butterworth filter and the Bessel filter, having improved roll off characteristics in comparison to those of the Bessel filter and a firmly tamed phase non-linearity within the pass band. The simulated eye closure for the 40 Gb CSRZ modulation format for the filter of the present invention is only 0.12 dB, as compared to 0.68 dB for the Butterworth filter, and the filter of the present invention has 26% higher eye opening, as compared to the Bessel filter.

Although the present invention has been illustrated and described herein with reference to preferred embodiments and examples thereof, it will be readily apparent to one of ordinary skill in the art that other embodiments and examples may perform similar functions and/or achieve similar results. All such equivalent embodiments and examples are within the spirit and scope of, and are contemplated by, the present invention. Therefore, all such equivalent embodiments and examples are intended to be covered by the following claims.

What is claimed is:

1. A method for providing a filter having equal group delay ripple, the method comprising:
   limiting the group delay ripple of the filter between a predetermined upper boundary and a predetermined lower boundary, wherein limiting the group delay ripple of the filter between the predetermined upper boundary and the predetermined lower boundary comprises:
   selecting a baseline filter of a predetermined order having a given transmission at a given frequency from a center frequency of the baseline filter;
   deriving a scaling factor by, where the given transmission of the baseline filter is equal to a predetermined transmission of the filter, comparing the given frequency from the center frequency of the baseline filter to a predetermined frequency from a center frequency of the filter;
   applying the scaling factor to a denominator polynomial of the baseline filter to obtain a denominator polynomial of the filter; and
   performing simplex-type multi-parameter optimization of a calculated group delay within a predetermined frequency band; and
   manufacturing the filter having the group delay ripple between the predetermined upper boundary and the predetermined lower boundary.

2. The method of claim 1, wherein the denominator polynomial of the baseline filter and the denominator polynomial of the filter represent a complex amplitude transmission of the baseline filter and a complex amplitude transmission of the filter, respectively.

3. The method of claim 1, wherein applying the scaling factor to the denominator polynomial of the baseline filter to obtain the denominator polynomial of the filter comprises narrowing a response of the baseline filter by the scaling factor to obtain a response of the filter.

4. The method of claim 1, wherein the baseline filter comprises a baseline filter selected from the group consisting of a Butterworth filter and a Bessel filter.

5. The method of claim 1, wherein the filter comprises an optical filter.

6. The method of claim 5, wherein the optical filter comprises a multi-layer dielectric optical interference filter.

7. A method for providing a filter having minimized phase non-linearity, the method comprising:
   limiting the phase non-linearity of the filter between a predetermined upper boundary and a predetermined lower boundary, wherein limiting the phase non-linearity of the filter between the predetermined upper boundary and the predetermined lower boundary comprises:
   selecting a baseline filter of a predetermined order having a given transmission at a given frequency from a center frequency of the baseline filter;
   deriving a scaling factor by, where the given transmission of the baseline filter is equal to a predetermined transmission of the filter, comparing the given frequency from the center frequency of the baseline filter to a predetermined frequency from a center frequency of the filter;

applying the scaling factor to a denominator polynomial of the baseline filter to obtain a denominator polynomial of the filter; and performing simplex-type multi-parameter optimization of a calculated phase non-linearity within a predetermined frequency band; and manufacturing the filter having the phase non-linearity between the predetermined upper boundary and the predetermined lower boundary.

8. The method of claim 7, wherein the denominator polynomial of the baseline filter and the denominator polynomial of the filter represent a complex amplitude transmission of the baseline filter and a complex amplitude transmission of the filter, respectively.

9. The method of claim 7, wherein applying the scaling factor to the denominator polynomial of the baseline filter to obtain the denominator polynomial of the filter comprises narrowing a response of the baseline filter by the scaling factor to obtain a response of the filter.

10. The method of claim 7, wherein the baseline filter comprises a baseline filter selected from the group consisting of a Butterworth filter and a Bessel filter.

11. The method of claim 7, wherein the filter comprises an optical filter.

12. The method of claim 11, wherein the optical filter comprises a multi-layer dielectric optical interference filter.

13. An equal group delay ripple filter, formed by the process comprising:

limiting the group delay ripple of the filter between a predetermined upper boundary and a predetermined lower boundary, wherein limiting the group delay ripple of the filter between the predetermined upper boundary and the predetermined lower boundary comprises:

selecting a baseline filter of a predetermined order having a given transmission at a given frequency from a center frequency of the baseline filter;

deriving a scaling factor by, where the given transmission of the baseline filter is equal to a predetermined transmission of the filter, comparing the given frequency from the center frequency of the baseline filter to a predetermined frequency from a center frequency of the filter;

applying the scaling factor to a denominator polynomial of the baseline filter to obtain a denominator polynomial of the filter; and performing simplex-type multi-parameter optimization of a calculated group delay within a predetermined frequency band; and manufacturing the filter having the group delay ripple between the predetermined upper boundary and the predetermined lower boundary.

14. The filter of claim 13, wherein the denominator polynomial of the baseline filter and the denominator polynomial of the filter represent a complex amplitude transmission of the baseline filter and a complex amplitude transmission of the filter, respectively.

15. The filter of claim 13, wherein applying the scaling factor to the denominator polynomial of the baseline filter to obtain the denominator polynomial of the filter comprises narrowing a response of the baseline filter by the scaling factor to obtain a response of the filter.

16. The filter of claim 13, wherein the baseline filter comprises a baseline filter selected from the group consisting of a Butterworth filter and a Bessel filter.

17. The filter of claim 13, wherein the filter comprises an optical filter.

18. The filter of claim 17, wherein the optical filter comprises a multi-layer dielectric optical interference filter.

19. A minimized phase non-linearity filter, formed by the process comprising:

limiting the phase non-linearity of the filter between a predetermined upper boundary and a predetermined lower boundary, wherein limiting the phase non-linearity of the filter between the predetermined upper boundary and the predetermined lower boundary comprises:

selecting a baseline filter of a predetermined order having a given transmission at a given frequency from a center frequency of the baseline filter;

deriving a scaling factor by, where the given transmission of the baseline filter is equal to a predetermined transmission of the filter, comparing the given frequency from the center frequency of the baseline filter to a predetermined frequency from a center frequency of the filter;

applying the scaling factor to a denominator polynomial of the baseline filter to obtain a denominator polynomial of the filter; and performing simplex-type multi-parameter optimization of a calculated phase non-linearity within a predetermined frequency band; and manufacturing the filter having the phase non-linearity between the predetermined upper boundary and the predetermined lower boundary.

20. The filter of claim 19, wherein the denominator polynomial of the baseline filter and the denominator polynomial of the filter represent a complex amplitude transmission of the baseline filter and a complex amplitude transmission of the filter, respectively.

21. The filter of claim 19, wherein applying the scaling factor to the denominator polynomial of the baseline filter to obtain the denominator polynomial of the filter comprises narrowing a response of the baseline filter by the scaling factor to obtain a response of the filter.

22. The filter of claim 19, wherein the baseline filter comprises a baseline filter selected from the group consisting of a Butterworth filter and a Bessel filter.

23. The filter of claim 19, wherein the filter comprises an optical filter.

24. The filter of claim 23, wherein the optical filter comprises a multi-layer dielectric optical interference filter.

25. An optical telecommunications network, comprising:

at least one of a filter having equal group delay ripple and a filter having minimized phase non-linearity, formed by the process comprising:

limiting at least one of the group delay ripple and the phase non-linearity of the filter between a predetermined upper boundary and a predetermined lower boundary, wherein limiting at least one of the group delay ripple and the phase non-linearity of the filter between the predetermined upper boundary and the predetermined lower boundary comprises:

selecting a baseline filter of a predetermined order having a given transmission at a given frequency from a center frequency of the baseline filter;

deriving a scaling factor by, where the given transmission of the baseline filter is equal to a predetermined transmission of the filter, comparing the given frequency from the center frequency of the baseline filter to a predetermined frequency from a center frequency of the filter;

applying the scaling factor to a denominator polynomial of the baseline filter to obtain a denominator polynomial of the filter; and performing simplex-type multi-parameter optimization of at least one of a calculated group delay and a calculated phase non-linearity within a predetermined frequency band; and manufacturing the filter having at least one of the group delay ripple and the phase non-linearity between the predetermined upper boundary and the predetermined lower boundary.

* * * * *